United States Patent Office 2,953,414
Patented Sept. 20, 1960

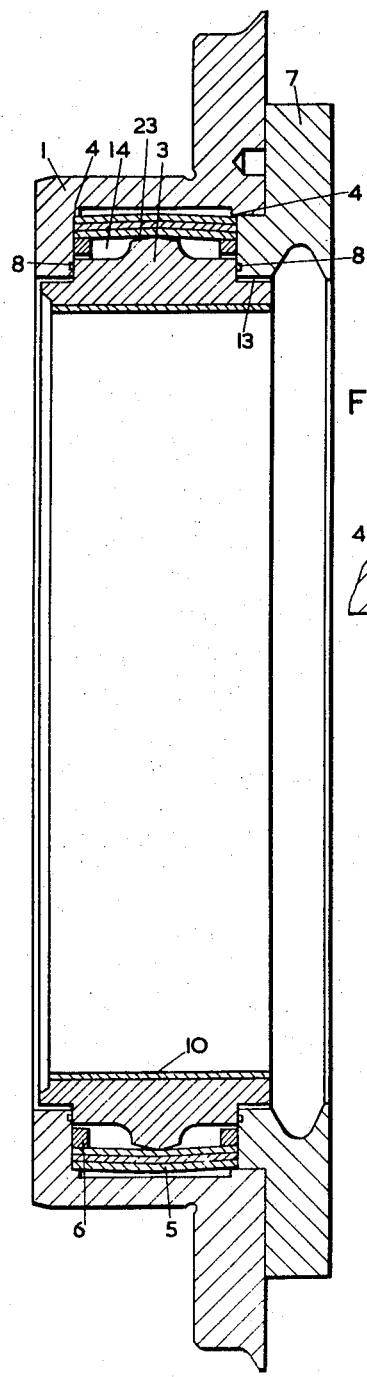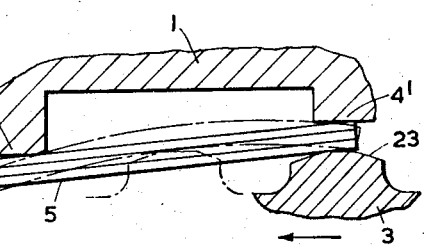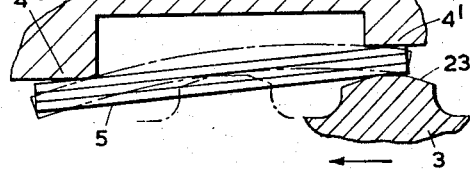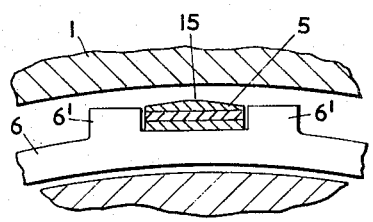

2,953,414

BEARINGS

Jerzy André Lorett, Leicester, and Clifford Morris, Kenneth William Mayne, and Kenneth John Bett, Whetstone, England, assignors to The English Electric Company Limited, London, England, a British company Filed July 30, 1958, Ser. No. 752,007

Claims priority, application Great Britain Aug. 6, 1957

4 Claims. (Cl. 308—26)

The present invention relates to bearings of the type in which a supporting ring of the bearing proper rests on a plurality of leaf springs which in turn rest in a bearing housing. The object of this known arrangement is to afford a certain amount of radial freedom to the shaft journalled in such a bearing allowing for vibrations and misalignment.

In bearings of this type the leaf springs have, for example, been arranged substantially in the pattern of a polygon circumscribed to the supporting ring and inscribed to the bearing housing. Such an arrangement is limited as regards size and strength of the leaf springs, and while proving satisfactory for comparatively light machines, is not suitable for very heavy machines.

According to the present invention we provide a bearing comprising, in combination, a bearing housing having two inner shoulders, a cover plate closing the said housing endwise, a supporting ring having a circumferential ridge at its middle and being located axially and slidably guided radially between the said housing and cover plate, a bearing proper fitted internally into said supporting ring, and a plurality of leaf springs arranged substantially parallel to the axis of the bearing and distributed over the circumference thereof in such a manner that they rest with their ends on the said inner shoulders of the said housing and at their middle on the said ridge.

Further features of our invention will become apparent hereinbelow.

In order that the invention may be clearly understood, an embodiment thereof will now be described by way of example with reference to the accompanying drawing, in which:

Fig. 1 is a longitudinal section of the bearing and its mounting, and

Fig. 2 is a plan view of one of the leaf springs on a larger scale,

Fig. 3 is a part section on a larger scale showing a preferred manner of fitting the springs.

Fig. 4 is a part-cross section of the ends of the leaf springs and adjacent annular plates.

The thin walled bearing proper 10 is fitted into a supporting ring 3 which has two recessed shoulders 13 at its ends and a circumferential ridge 23 at its middle, which ridge is slightly chamfered in both directions. The bearing housing 1 and its cover plate 7 enclose between them an annular recess 14 wherein a plurality of leaf springs 5 are arranged substantially parallel to the axis of the bearing and distributed over the circumference thereof in such a manner that they rest with their ends on inner shoulders 4 of the said housing, and at their middle on the obtuse edge of the chamfered ridge 23.

There is a slight radial clearance (indicated exaggeratedly in Fig. 1 for clarity) between the shoulders 13 of the supporting ring 3 and the adjacent internal cylindrical faces of the housing 1 and cover plate 7, to allow a certain radial freedom to the supporting ring 3 with respect to the housing 1. Radial movement is limited by the abutment of the axial surfaces of the shoulders 13 on the one hand and the bearing housing 1 and cover plate 7 on the other. The supporting ring 3 and the housing 1 are mutually restrained in the axial direction and guided in the radial direction by their contacting flat annular faces at the shoulders 13, which are sealed by rubber cords 8 so as to allow the recesses 14 to be filled with oil from where oil may be fed to the bearings.

The ends of the leaf springs 5 are located from inside by means of annular plates 6 which have radial clearance from the supporting rings 3.

As shown in Fig. 2 the ends 15 of that lamination of the leaf springs 5 which rests on the shoulders 4 is radiused (with a small flat) to prevent the edges of said lamination from digging into the shoulders 4. The plan form of the leaf spring 5 is converging towards the ends so as to allow for the higher bending load in the middle and to leave space between the ends of adjacent leaf springs for outward radial projections 6' of the annular plates 6. Although the springs 5 may be of equal strength all round the periphery of the bearing there is some advantage in having an asymmetrical arrangement with stronger springs in the bottom zone of the bearing housing. This arrangement causes the shaft to assume a more central position in the housing on initial assembly, whereas with even spring tension, there is a tendency for the shaft to be displaced towards the bottom. This effect may be achieved by altering the thicknesses of the leaves in the springs. In particular there may be strong springs at the bottom of the bearing, weak springs at the top and intermediate ones at the sides. This arrangement permits a much closer fit between the shoulders 13 and the housing 1.

If, as shown in Fig. 1, the shoulders 4 are of the same diameter, the method of assembling the springs and bearing to give initial compression is to fit two leaves in each spring around the bearing and then to drive in a third leaf between the other two. This method, while feasible for assembly, makes it extremely difficult to take the bearing to pieces again. An alternative method is shown in Fig. 3 where the outer shoulders 4' are of greater diameter than the inner shoulders 4" so that when the springs 5 are laid in position they lie at a small angle to the axis of the bearing. The diameter of the supporting ring 3 at the chamfered ridge 23 is such that it will just enter between the springs 5. When the ring 3 is forced axially in the direction of the arrow into its working position, the springs 5 are deflected giving the required pre-loading.

Bearings according to the present invention have been found suitable even for very heavy machines.

What we claim as our invention and desire to secure by Letters Patent, is:

1. A bearing comprising, in combination, a bearing housing having two inner shoulders, a cover plate closing the said housing endwise, a supporting ring having a circumferential ridge at its middle and being located axially and slidably guided radially between the said housing and cover plate, a bearing proper fitted internally into said supporting ring, and a plurality of leaf springs arranged substantially parallel to the axis of the bearing and distributed over the circumference thereof in such a manner that they rest with their ends on the said inner shoulders of the said housing and at their middle on the said ridge, 2. A bearing as claimed in claim 1, comprising annular plates surrounding the ends of said supporting ring and having radial outward projections, the said leaf springs converging in plan form towards their ends, and engaging with these ends between the said projections.

3. A bearing as claimed in claim 1, wherein the said leaf springs at the zone of higher radial loading of the bearing are stronger than the leaf springs at zones of lower radial loading.

4. A bearing as claimed in claim 1, wherein the said inner shoulders of the said bearing housing are of unequal diameter, the shoulder on the side adjacent said cover plate being of a larger diameter than the shoulder at the opposite side of the said housing.

References Cited in the file of this patent

UNITED STATES PATENTS

| | | |
|---|---|---|
| 731,054 | Hoyt | June 16, 1903 |
| 1,373,084 | Leitch | Mar. 29, 1921 |
| 2,602,009 | Barlow et al. | July 1, 1952 |